(12) United States Patent
Jobanputra

(10) Patent No.: US 12,346,105 B2
(45) Date of Patent: Jul. 1, 2025

(54) TASK MANAGEMENT FOR UNMANNED AERIAL VEHICLES

(71) Applicant: Skydio, Inc., Redwood City, CA (US)

(72) Inventor: Roshan Neel Jobanputra, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 18 days.

(21) Appl. No.: 17/960,371

(22) Filed: Oct. 5, 2022

(65) Prior Publication Data

US 2024/0118689 A1    Apr. 11, 2024

(51) Int. Cl.
| | |
|---|---|
| G05D 1/00 | (2024.01) |
| G05D 1/60 | (2024.01) |
| G08G 5/32 | (2025.01) |
| G08G 5/55 | (2025.01) |
| G08G 5/57 | (2025.01) |

(52) U.S. Cl.
CPC ......... *G05D 1/0022* (2013.01); *G05D 1/0088* (2013.01); *G05D 1/104* (2013.01); *G05D 1/60* (2024.01); *G08G 5/32* (2025.01); *G08G 5/55* (2025.01); *G08G 5/57* (2025.01)

(58) Field of Classification Search
None
See application file for complete search history.

(56) References Cited

U.S. PATENT DOCUMENTS

| | | | |
|---|---|---|---|
| 8,135,852 B2 | 3/2012 | Nilsson et al. | |
| 8,930,475 B1 | 1/2015 | North et al. | |
| 9,262,498 B2 | 2/2016 | Ferris | |
| 10,909,859 B1* | 2/2021 | Dodd | G07C 5/0816 |
| 10,999,357 B1 | 5/2021 | Lan et al. | |
| 2003/0051047 A1 | 3/2003 | Horel et al. | |
| 2016/0111006 A1* | 4/2016 | Srivastava | G05D 1/0094 |
| | | | 701/3 |
| 2017/0021946 A1 | 1/2017 | Weller et al. | |
| 2017/0177609 A1 | 6/2017 | North et al. | |

(Continued)

FOREIGN PATENT DOCUMENTS

| | | |
|---|---|---|
| EP | 3858732 A1 | 8/2021 |
| WO | 2018080425 A1 | 5/2018 |
| WO | 2021046021 A1 | 3/2021 |

OTHER PUBLICATIONS

International Application No. PCT/US2023/076073, International Search Report, Written Opinion, 15 pages, Feb. 1, 2024.

*Primary Examiner* — Peter D Nolan
*Assistant Examiner* — Michael F Whalen

(57) ABSTRACT

Technology is disclosed herein for operating a tasking service for UAVs. In an implementation, a tasking service receives task parameters which includes a desired state of the UAVs for performing a task and service information associated with performing the task. The tasking service continuously receives state information from the UAVs which identifies a present state of the UAVs and continuously evaluates the present state of the UAVs with respect to the desired state. When the present state of an UAV matches the desired state, the tasking service assigns the task to the UAV and provides the service information to the UAV. In an implementation, the tasking service receives task parameters via an application programming interface from a client application in communication with the tasking service.

20 Claims, 9 Drawing Sheets

(56) References Cited

U.S. PATENT DOCUMENTS

| | | | |
|---|---|---|---|
| 2018/0072416 A1* | 3/2018 | Cantrell | B64U 50/37 |
| 2019/0223237 A1* | 7/2019 | Hong | H04L 63/105 |
| 2020/0209892 A1* | 7/2020 | Luo | G08G 1/0133 |
| 2020/0236174 A1 | 7/2020 | Evans et al. | |
| 2021/0088337 A1 | 3/2021 | Koubaa | |
| 2021/0134162 A1 | 5/2021 | Sundaramurthy et al. | |
| 2021/0304620 A1 | 9/2021 | Selvarajan et al. | |
| 2022/0055747 A1 | 2/2022 | Zhao et al. | |
| 2022/0083987 A1 | 3/2022 | Bhunia et al. | |

\* cited by examiner

TASK MANAGEMENT FOR UNMANNED AERIAL VEHICLES

TECHNICAL FIELD

Various implementations of the present technology relate to unmanned aerial vehicles (UAVs) and, in particular, to task management of unmanned aerial vehicles.

BACKGROUND

In commercial and military operations, there is growing reliance on the autonomous capabilities of drones which reduce or even eliminate the need to have a trained drone operator in the vicinity of the drone to actively pilot it. Fleets of drones are employed in a variety of scenarios for on-demand tasks or scheduled missions, such as making deliveries or capturing real-time imaging data, but also for operations which may be risky or difficult to accomplish on the ground, such as deployments to capture video or sensor data in remote or largely inaccessible areas. Drones can accomplish these types of tasks with greater self-reliance and less human intervention.

However, as drones are becoming more sophisticated and finding increased utility in the commercial and military spheres, managing fleets of drones has also become increasingly complex for drone operators. Managing a fleet often includes not just planning and scheduling missions for drones, but also drone maintenance activities, such as battery charge management and software updates. In addition to fleet management, many drone activities produce sensor as well as telemetry data which adds data handling to the list of tasks required of drone fleet operators.

Typically, when transmitting or receiving data, drones use a dedicated controller or ground station to bridge communication to other computing devices, for example, in the case of a user (other than the pilot) viewing livestream video from the drone on a laptop. If the user desires access to or control of a drone from the laptop, this requires passing communication through the controller which in turn adds complexity to the user experience, introduces additional latency to video and data feeds, and often requires the use of custom software applications on the device.

OVERVIEW

Systems, methods and software for operating a tasking service for UAVs is disclosed herein for a tasking service for UAVs. In an implementation, a tasking service receives task parameters which includes a desired state of the UAVs for performing a task and service information associated with performing the task. The tasking service continuously receives state information from each of the UAVs which identifies a present state of the UAVs and continuously evaluates the present state of the UAVs with respect to the desired state. When the present state of an UAV matches the desired state, the tasking service assigns the task to the UAV and provides the service information to the UAV. In an implementation, the tasking service receives task parameters via an application programming interface (API) from a client application that is remote with respect to the tasking service and the UAVs.

In various implementations, the service information associated with performing the task includes connection information for connecting to an ancillary service associated with the task. The ancillary service may comprise a cloud storage service or a video relay service in an exemplary usage. In some implementations, the connection information for connecting to the ancillary service includes a URL (uniform resource locator), credential information, and/or an encryption key. In still other implementations, the task parameters include a workload comprising actions to be taken in association with performing the task. In an implementation, the desired state comprises one or more operational characteristics of the UAV including a battery charge level and a wireless connectivity strength.

A UAV is also disclosed herein comprising a flight control system including one or more processors, one or more computer readable storage media, and program instructions stored on the computer readable storage media. When executed by the one or more processors of the flight control system, the program instructions direct the one or more processors to establish a wireless connection to an Internet access point for network communication with a tasking service. The program instructions further direct the one or more processors to continually send state information of the UAV to the tasking service, wherein the state information pertains to the present state of the UAV and which is evaluated by the tasking service against a desired state associated with a task. When the present state matches the desired state, the program instructions further direct the one or more processors to receive service information pertaining to the task from the tasking service and to perform the task according to the service information.

Technology is also disclosed herein for a computing apparatus to display a user interface for an application for scheduling tasks to be performed by UAVs. The computing apparatus receives via the user interface user input comprising task parameters for a task. The task parameters identify a desired state of a UAV for performing the task and service information associated with performing the task. The program instructions further direct the computing apparatus to send the user input comprising the task parameters to a tasking service which assigns the task to a UAV based on evaluating the present state of the UAV against the desired state. The computing apparatus also receives data produced by the UAV in performing the task from the UAV.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
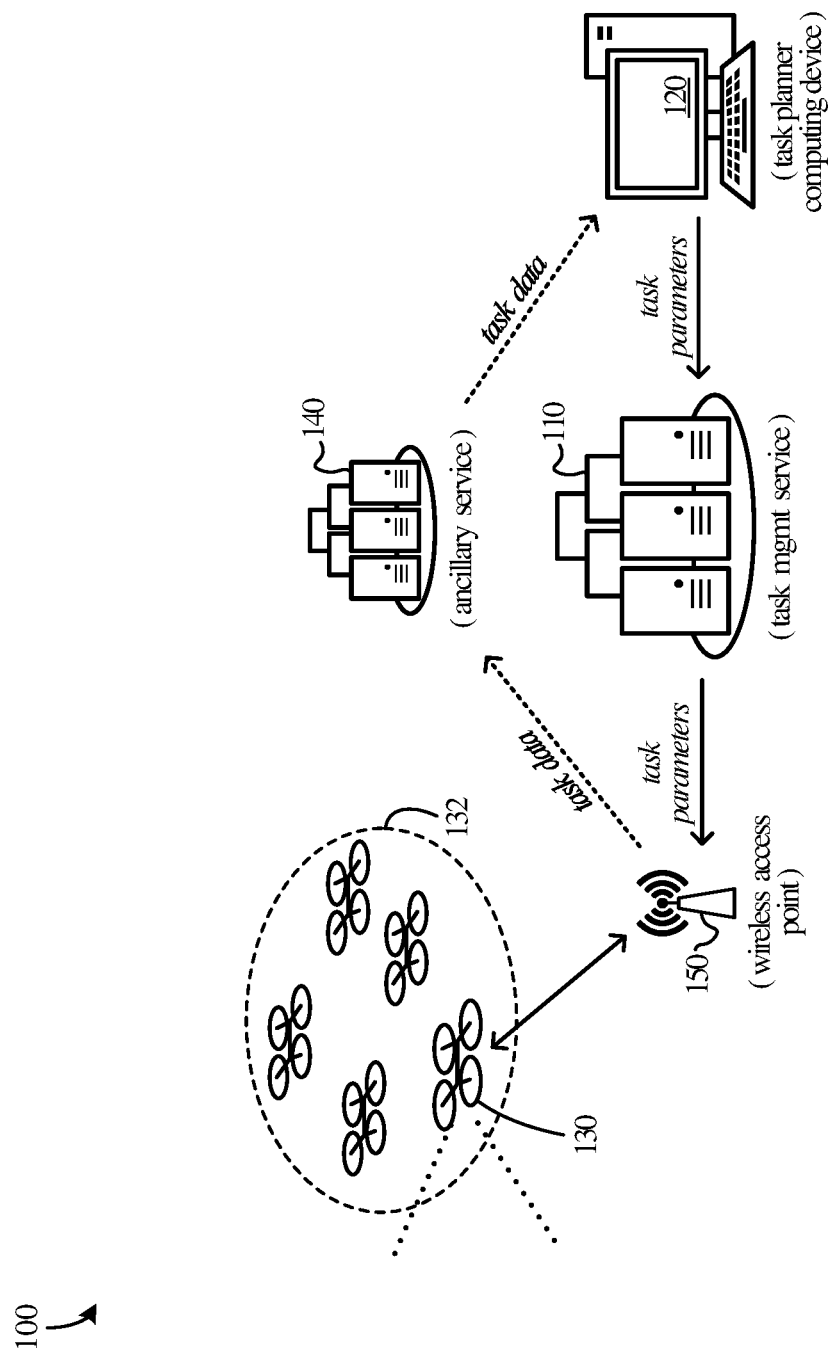
FIG. 1 illustrates an operational environment of task planning for an unmanned aerial vehicle in an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology discussed herein enables remote operation of an Internet-connected UAV via a network connection to the vehicle. In various implementations, a UAV establishes a wireless connection to an Internet access point by which the UAV can communicate with a UAV tasking service. The tasking service manages tasks for a UAV or for a fleet of UAVs, including configuring, planning, scheduling, and otherwise managing tasks for UAVs. In an implementation, the tasking service is a cloud-based service which receives task parameters from a client application executing on user computing device, then transmits the parameters to the assigned drone via an API. Because the UAV connects to a wireless Internet access point directly, data transfer, including video transfer, has much lower latency than when connecting via a controller.

In an exemplary implementation, a user configures a task to be performed by a UAV in the user interface of the client application. In configuring the task, the user may provide various parameters including what actions the UAV is to perform, where and when the task is to be performed, and connection information for an ancillary service receiving data produced by the drone in performing the task. Tasks can comprise any functionality available on the UAV, which may include gathering imaging data with onboard cameras or sensors, such as video, still photography, night vision imaging, or infrared thermal imaging. Other sensors may relate to gathering other types of data, such as environmental data (e.g., pressure, temperature, wind speed, or magnetometer data). Still other tasks for which a drone may be deployed include sample collection and transporting items for delivery.

The ancillary service specified in the service information may be, for example, a video relay service by which the user can receive a livestream video feed from a camera onboard the UAV. In other scenarios, the ancillary service may be cloud data storage which receives data produced by onboard sensors, such as cameras, as the task is performed. In various implementations, the tasking service may verify the credentials of an organizational user, such as a drone fleet manager, to configure a task for a UAV associated with the organization. Connection information to the ancillary service may include a web address such as a URL or IP address to which the UAV is to transmit data gathered in performing the task. Connection information may also include credential information such as account logins and passwords, authentication tokens, and/or keys for data encryption.

In other exemplary implementations, the UAV downloads media from the ancillary service. For example, the UAV may be tasked with performing a software update. With the connection information provided in the service information, the UAV connects to a cloud-hosted ancillary service, such as a manufacturer's software support service, downloads the update, and installs it. In still other implementations, the UAV may be tasked with flying a programmed flight path which requires the UAV to download the flight path from a data service where the flight path is stored.

The task parameters also include a desired state of the UAV for performing the to-be-assigned task. The desired state includes settings relating to various operational characteristics of the UAV that pertain to the task, such as a minimum pre-takeoff battery charge level, camera capture settings, and automated flight-path behavior settings. Operational characteristics may also include a current location of the vehicle or information relating to the availability of the UAV (e.g., is the UAV assigned to another task or is due for a software upgrade). Other operational characteristics can include a camera resolution, an onboard data storage capacity of the vehicle, or a software version. Still other operational characteristics may include identifying a specific vehicle for performing the task. In some implementations, the tasking service may suggest or specify additional desired state settings based on the task parameters as configured by the user. For example, depending on the location and duration of a task, the tasking service may suggest or specify a minimum battery charge level that would be necessary for completing the task. The tasking service may also specify a desired state setting relating to vehicle availability.

Upon receiving task parameters from the client application, the tasking service assigns the task to a UAV based on matching the desired vehicle state associated with the task to the present state of the UAV. To determine a match, the tasking service continually receives state information from the candidate UAVs (i.e., the UAVs which may be assigned the task). As the tasking service receives state information for the UAVs, it continually evaluates the state information against the desired state of the task to be assigned. When state information of a vehicle matches the desired state, the tasking service assigns the task to that vehicle.

In an implementation, one or more UAVs transmit desired state data to the tasking service at regular intervals (e.g., 5 Hz). A queueing service operating in connection with or by the tasking service queues the received state data for evaluation on a first-in, first-out basis. The tasking service continually compares the queued state data to the desired state until a match is found, wherein finding a match comprises matching the desired state settings with their respective present vehicle state settings or determining that a vehicle state value satisfies a desired state setting. When a match is found, the tasking service assigns the task to the corresponding UAV.

In still other implementations, the desired state may identify a specific vehicle for the task to which the tasking service will assign the task directly. If any settings of the present state of the specified vehicle do not match the corresponding ones of the desired state, the tasking service may enable the UAV to enter the desired state by transmitting instructions to the onboard flight controller of the UAV to adjust its settings to match those of the desired state.

Communication between the tasking service (or a cloud service on which the tasking service is executing) and the UAV may require authentication. In an implementation, authentication comprises the use of public and private encryption key pairs by which a UAV can authenticate task information received from the tasking service and by which the tasking service can authenticate information received from the UAV.

A technical effect of direct vehicle connectivity (i.e., direct connections with the unmanned aerial vehicle) is to enable remote operation of drone without the need for a local operator. A direct connection to the drone obviates need for mobile device or ground station to bridge communication with the drone, with the additional benefit of, for example, enabling extremely low latency for livestream video or teleoperation (live piloting of the vehicle from a remote computing device). Other advantages of the disclosed technology include web-enabled access using standard web protocols which eliminates the need for a user to download custom-built software applications. In addition, with direct connectivity to the vehicles, a drone fleet operator can monitor real-time status of his or her entire fleet (e.g., receive data relating to battery charge levels or software updates) from a single networked computing device. Additional benefits of direct connectivity to the drone rather than through a controller or ground station include access to all drone functionalities rather than just those functions or features enabled through the controller software or API.

Turning now to the Figures, FIG. 1 illustrates operational environment 100 of task planning for a UAV in an implementation. Operational environment 100 includes UAV fleet 132 including UAV 130 in communication with wireless access point 150. Operational environment 100 also includes task management service 110 and ancillary service 140, which may be operating on a network or cloud-based server, and computing device 120 of a task planner which is in communication with at least task management service 110 and ancillary service 140 over one or more wired or wireless networks.

Figure 9:
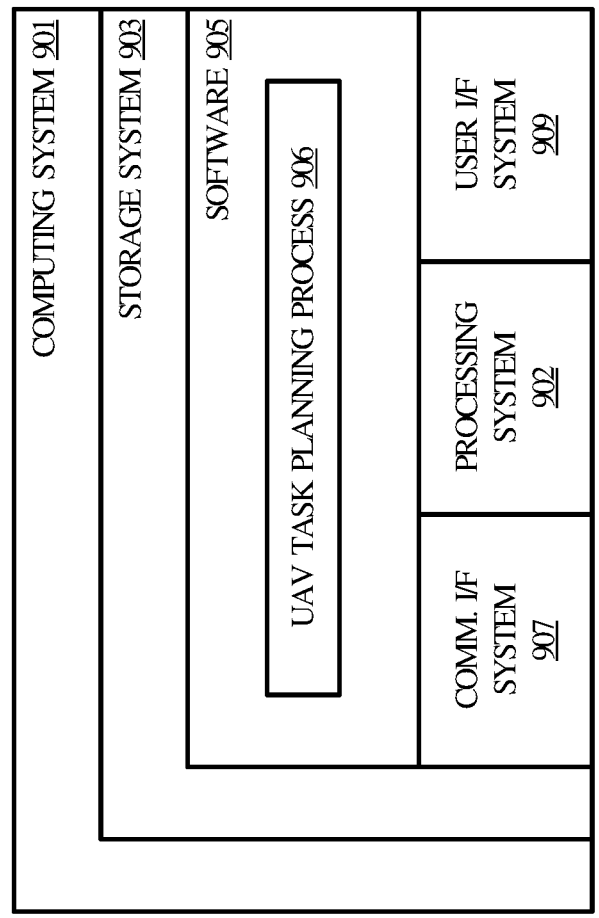
FIG. 9 illustrates a computing system suitable for implementing the various operational environments, architectures, processes, scenarios, and sequences discussed below with respect to the other Figures.

Task management service 110 is representative of one or more services (including microservices) capable of interfacing with computing devices and network-connected UAVs for UAV task management and providing the UAV task management processes, services, and methods described herein. Task management service 110 also comprises services capable of interfacing with UAV fleet 132 or with other data services in communication with UAV fleet 132. In an implementation, task management service 110 is a subprocess or subservice of a UAV telemetry data service. Task management service 110 may be implemented in the context of one or more data centers and one or more computing devices of which computing device 901 of FIG. 9 is representative.

UAV fleet 132 is representative of drones or unmanned aerial vehicles capable of communicating with wireless access point 150 for Internet access to cloud services such as task management service 110 and ancillary service 140. UAV 130 is representative of a UAV capable of performing various tasks including capturing imaging or other sensor data.

It may be appreciated that UAV 130 may also be in wireless communication with a ground station, base station, or controller (not shown) by which UAV 130 may receive real-time commands, such as control commands by a UAV pilot in the proximity of or with a line of sight to UAV 130. The ground station or controller may connect to a wireless access point, such as wireless access point 150, for an Internet connection to task management service 110. Optionally, the ground station or controller may bridge communications between UAV 130 and task management service 110 as an alternative to direct vehicle connectivity.

Computing device 120 is representative of a computing device operated by a UAV task planner such as a UAV fleet dispatcher, a UAV pilot or teleoperator, or other organizational personnel or stakeholder associated with UAV fleet 132 in an implementation. Computing device 120 is representative of a computing device, such as a laptop or desktop computer, or mobile computing device, such as a tablet computer or cellular phone, capable of communicating with task management service 110 over one or more wired or wireless communication networks. Computing device 120 executes a client application for UAV task planning. The client application communicates with task management service 110, including transmitting UAV task planning information received via the user interface to task management service 110. In an implementation, task management service 110 may execute on computing device 120.

Ancillary service 140 is representative of a service capable of receiving data produced by a UAV during the performance of a task. Ancillary service 140 can comprise a cloud data store service, a video relay service, or other service for receiving, storing, sending, and otherwise managing sensor data (which may include imaging data or video data) or UAV telemetry data.

Wireless access point 150 is representative of a device capable of serving as a bridge between a wireless network and a wired network, such as a Wifi router. UAV 130 connects to wireless access point 150 on a wireless network, such as an 802.11 network, which allows UAV 130 to communicate with task management service 110 and other web-based or cloud-based services such as ancillary service 140.

In operation, computing device 120, executing a UAV task planning application and in communication with task management service 110, displays a user interface for planning a task for UAV 130. Computing device 120 receives input from a user comprising task parameters, such as where and when the task is to be performed as well as what actions the UAV will take in performing the task, such as recording video and transmitting the recorded video to a cloud data storage location, for example. The task parameters can also include a desired state of the UAV for performing the task including the operational characteristics of the UAV for performing the task. Computing device 120 transmits the task parameters to task management service 110. Computing device 120 may also receive user input via the user interface comprising a selection of a particular UAV to be used for the task, which computing device 120 transmits to task management service 110 as part of the task parameters.

Task management service 110 receives the task parameters from computing device 120. To select and assign the task to a UAV of UAV fleet 132, task management service continually receives state information from the UAVs in UAV fleet 132 which includes data relating to the present state of the vehicle. Present state information can include an indication of the battery charge level and wireless signal strength for communication pertaining to the strength of the signal received from a wireless access point, such as wireless access point 150. Present state information can also include a location of the vehicle as well as the availability of the vehicle for performing the task.

As task management service 110 receives present state information from UAV fleet 132, it evaluates the present state information against the desired state associated with the task received from computing device 120. When task management service 110 detects that the present state of, for example, UAV 130 matches the desired state, it assigns the task to UAV 130 and provides service information pertaining to the task to UAV 130.

Figure 2:
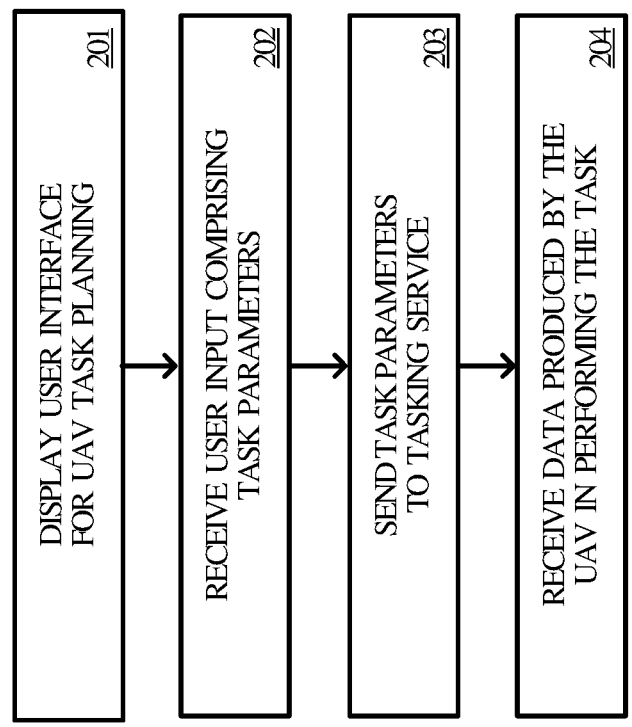
FIG. 2 illustrates a method of operating a user interface of task planning application in an implementation.

FIG. 2 illustrates process 200 implemented by a computing device, such as computing device 120 of FIG. 1, to plan and schedule a task for a UAV, such as a UAV of UAV fleet 132. Process 200 may be implemented in program instructions in the context of any of the software applications, modules, components, or other such elements of a suitable computing device, of which computing device 901 of FIG. 9 is representative. The program instructions direct the computing device to operate as follows, referring parenthetically to the steps in FIG. 2 and in the singular for the sake of clarity.

A computing device, such as a laptop or desktop computer or mobile computing device such as a tablet computer or smartphone, executes an application for UAV task planning which presents to the user (e.g., drone pilot, UAV fleet manager, etc.) a user interface for planning and scheduling a task for a UAV (step 201). In an implementation, the application is in communication with a UAV task management service to which task information will be sent.

In various implementations, the user interface of the task planning application may receive indications of the user's task parameter selections via interface elements such as hyperlinks, drop-down menus, text boxes, checkboxes, and radio buttons, to receive the trip information. For example, the user interface may present a geographical map of an area on which the user can indicate locations for performing one or more activities in the process of performing the task.

The computing device receives user input comprising task parameters relating to a task to be performed by a UAV via the user interface (step 202). In an implementation, the task parameters comprise service information pertaining to the task, such as where and when the task is to be performed. A task may be configured to be performed at a location specified by an address (e.g., a postal address) or GPS (Global Positioning System) coordinates or other type of geographic location data. The location may also comprise a location within a plant, warehouse, hangar, or campus, such as a dock, bay, aisle, bin, door, or lot. The time period for when the task is to be performed may be a specific date and/or time, or it may be performed on-demand, that is, at the time the task is planned. A task may also be scheduled to be repeated on a regular basis, such as nightly or weekly.

Service information may also include actions taken by the UAV in performing the task, for example, transmitting a live video feed, gathering imaging data for storage, or sending sensor data to a cloud data storage service where it can be retrieved for analysis or viewing at a later time. Service information may also identify an ancillary service for receiving data produced during performance of the task and provide connection information by which the UAV can communicate with the ancillary service, such as a URL, credential information (e.g., an account login and password), encryption keys, and/or authentication tokens.

Task parameters also include a desired state of the UAV for performing the task. The desired state comprises operational characteristics, settings and/or configuration information of the UAV for performing the task. The desired state may include a battery charge level of the UAV and a wireless signal strength relating to network connectivity. The desired state may also specify particular functionalities, such as the use of an environmental sensor or imaging sensor (e.g., thermal or infrared imaging). The desired state may also specify a particular UAV that the user has selected for performing the task.

When a task has been configured in the task planning application, the application sends the task information or parameters to a tasking service, of which task management service 110 of FIG. 1 is representative (step 203). In various implementations, the client application transmits the task information via an API to the tasking service. The tasking service may be a cloud-based or network service which communicates with the client application across one or more wired or wireless networks. In still other implementations, the tasking service may operate on the computing device executing the client application.

Upon receiving the task parameters, the tasking service selects a UAV for performing the task based on evaluating the present state of one or more UAVs with respect to the desired state identified in the task parameters and assigns the task to the selected UAV. When the selected UAV performs the task, data produced by the UAV in the course of performing the task is received by the client application (step 204). The task data may then be displayed in the user interface. For example, a UAV may be deployed to gather real-time video footage of an event. As the UAV uses an onboard camera to capture the event, it simultaneously transmits the video feed to a video relay service from which the client application receives the video feed for display.

Figure 3:
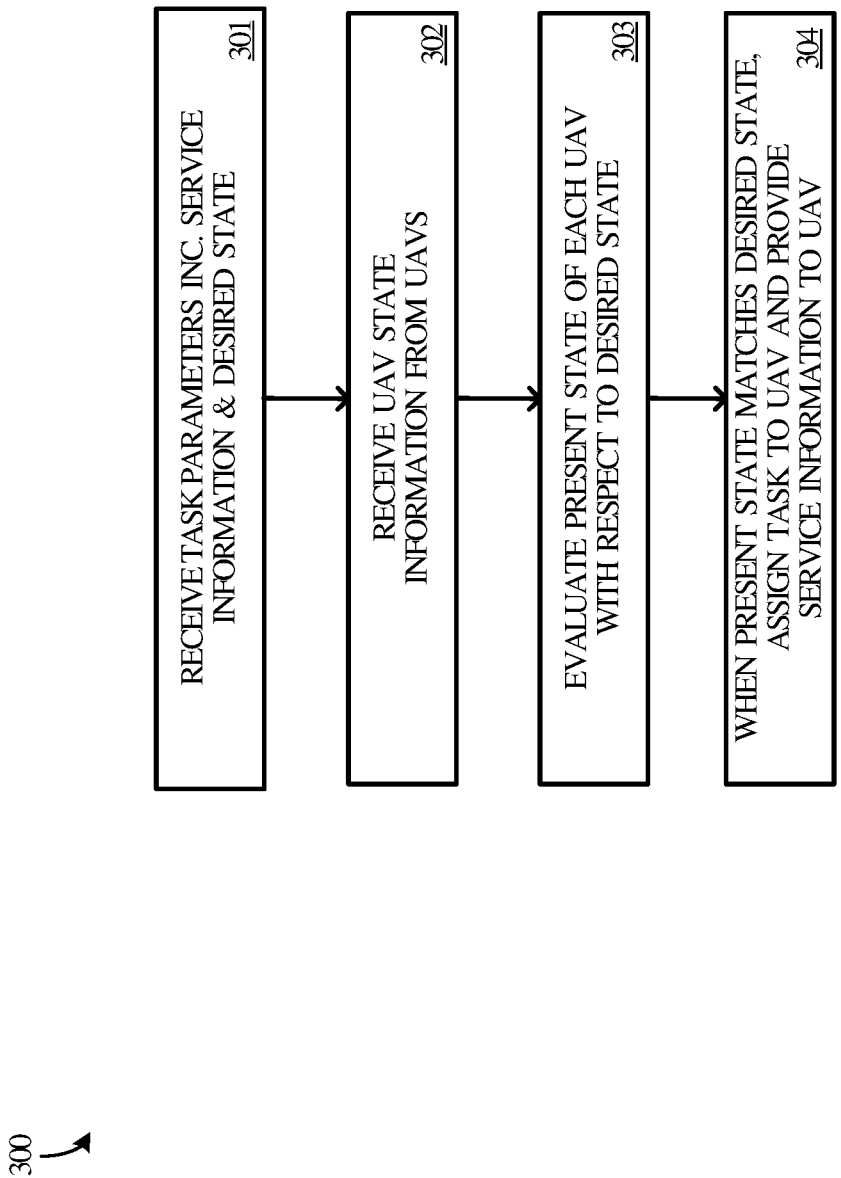
FIG. 3 illustrates a method of operating an unmanned aerial vehicle in an implementation.

FIG. 3 illustrates process 300 implemented by a UAV tasking service, such as UAV task management service 110 of FIG. 1, to plan and schedule a task for a UAV in an implementation. Referring to FIG. 3, process 300 may be implemented in program instructions in the context of any of the software applications, services, micro-services, modules, components, or other such elements of a suitable operations service, such as task management service 110. The tasking service may be implemented in the context of a data center or other such environment, and on one or more computing devices, of which computing device 901 of FIG. 9 is representative. The program instructions direct the one or more computing devices that provide a tasking service to operate as follows, referring parenthetically to the steps in FIG. 3.

In operation, the tasking service receives task parameters pertaining to a task to be performed by a UAV in an implementation (step 301). The task parameters may be received from a client application executing a computing device which displays a user interface for configuring UAV tasks. A user, such as a UAV fleet dispatcher or UAV operator, may configure task parameters for a task which include service information and desired state information. The service information includes contextual information about the task, such as where and when the task is to be performed, along with actions, or activities to be performed. Service information may also identify an ancillary service for receiving any data produced by the UAV (e.g., sensor data or imaging data captured by onboard sensors or cameras), along with connection information by which the UAV can send the task data to the ancillary service for further handling, storage, etc.

Task parameters also include desired vehicle state information comprising configuration information or settings of the UAV for performing the task. Desired state information can include a battery charge level for the UAV and a wireless connectivity strength level. Desired state information can comprise other settings or parameters relating to components onboard the UAV which will be used during the performance of the task, for example, a camera resolution specification, use of a night-vision mode, thermal or infrared sensing. Desired state information may also identify a particular UAV to be used for the task.

In some implementations, the tasking service may suggest or specify additional desired state settings based on the task parameters received from the client application. For example, the tasking service may determine a minimum battery charge level of the UAV based on the duration of a task and may suggest or specify the minimum charge level which is displayed in the user interface of the client application. The tasking service may also specify a desired state relating to the availability of a UAV during the time period for performance of the task.

The tasking service also receives state information from each of one or more UAVs (step 302). The state information relates to a present state of the UAV and includes operational or performance characteristics of the UAV. State information may include the current battery charge level and an indication of the current wireless signal strength. State information can also include the location of the vehicle and the availability of the UAV for performing the task. For example, a UAV may indicate that it is scheduled for a task comprising downloading and installing a software update at the time the task is to be performed. The present state information of a UAV may also indicate that it is due for routine maintenance.

The tasking service evaluates the state information of each of the one or more UAVs with respect to the desired state of the to-be-assigned task (step 303). In an implementation, the present state information for each of the one or more UAVs is received by a queueing service operated by or in connection with the tasking service. The queueing service queues the present state information as it is received on a first-in, first-out basis. The tasking service evaluates each set of present state information in the queue against the desired state information associated with the task.

When the tasking service detects that the present state of a drone matches the desired state of the task, it assigns the task to the corresponding drone (step 304). Matching the present state of the drone to the desired state may comprise comparing various settings of the state information to determine if the settings are the same or if a UAV setting meets a required setting of the desired state (e.g., a minimum battery charge level of 40% is satisfied by any charge level at or above 40%).

Figure 4:
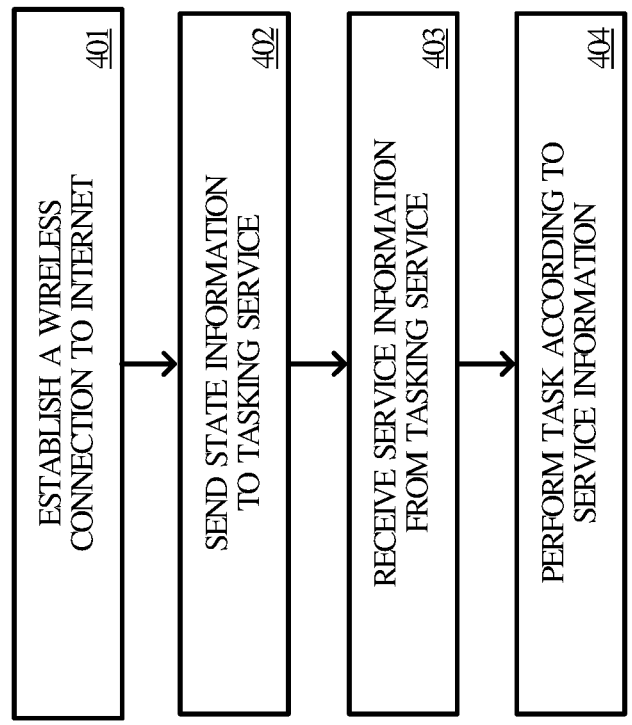
FIG. 4 illustrates a method of operating task planning service unmanned aerial vehicles in an implementation.
Figure 8:
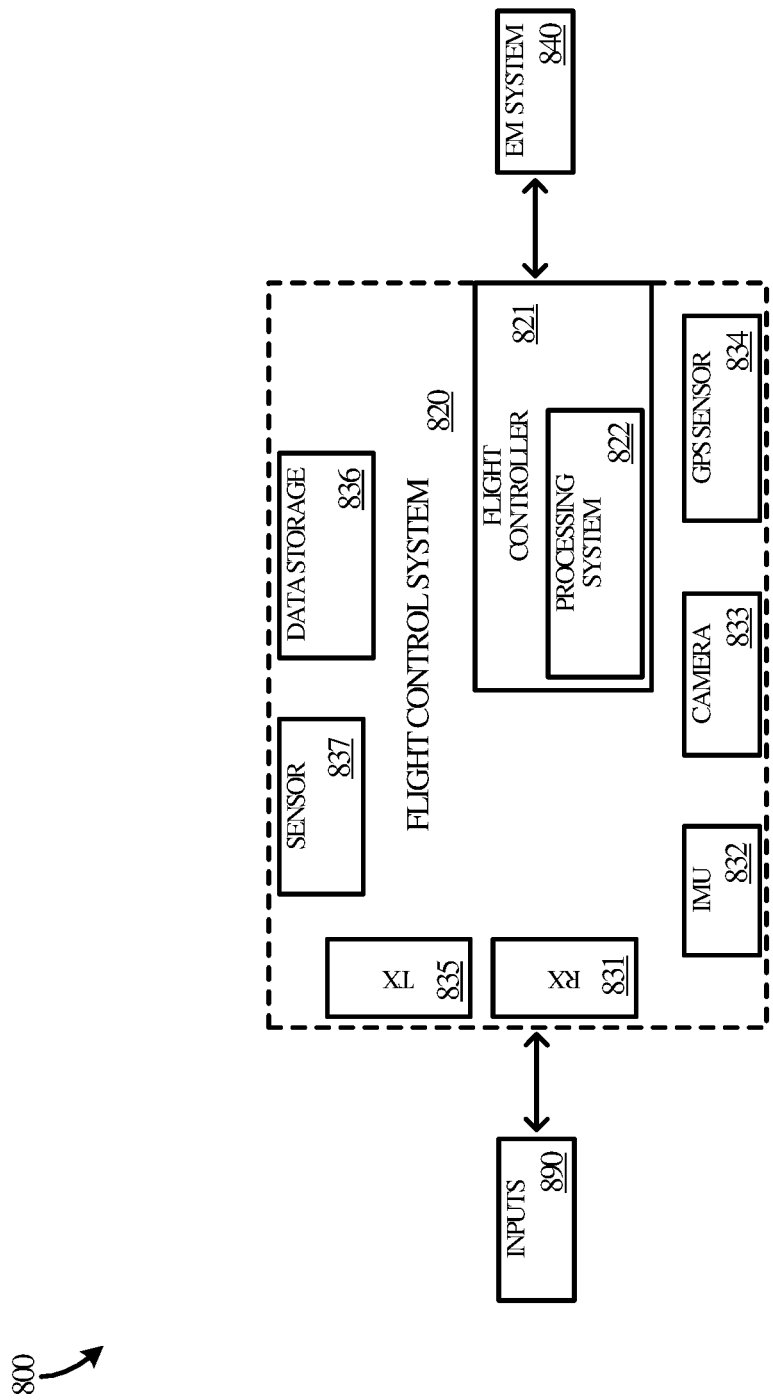
FIG. 8 illustrates a systems architecture of a UAV in an implementation.

FIG. 4 illustrates process 400 implemented by a UAV, such as UAV 130 of FIG. 1, to receive and perform an assigned task. Process 400 may be implemented in program instructions in the context of any of the software applications, services, micro-services, modules, components, or other such elements of a UAV, of which UAV systems architecture 800 of FIG. 8 is representative. The program instructions direct the UAV to operate as follows, referring parenthetically to the steps in FIG. 4 and in the singular for the sake of clarity.

The UAV establishes a wireless connection to the Internet via a wireless access point (step 401). The UAV may connect to the wireless access point via a wireless network, such as an 802.11 network. The wireless access point comprises a router which bridges the wireless network and a wired network allowing the UAV to connect to the Internet to communicate with other Internet-connected devices or to connect to devices on a local area network.

With a connection established, the UAV sends state information to a tasking service via one or more wired or wireless network connections (step 402). The state information comprises a present state of the UAV and includes operational or performance characteristics of the UAV. State information may include the current battery charge level and an indication of the current wireless signal strength. State information can also include the location of the vehicle and the availability of the UAV for performing the task. In various implementations, communication between the UAV and the tasking service may be handled through a web service or API which allows the UAV to interact with a client device without the need for customized software.

The tasking service evaluates the state information with respect to a desired state of a task. Desired state information can include a battery charge level for the UAV and a wireless connectivity strength level. Desired state information can comprise other settings or parameters relating to components onboard the UAV which will be used during the performance of the task, for example, a camera resolution specification, a night-vision mode, or thermal/infrared sensing. Desired state information may also identify a particular UAV to be used for the task. When the tasking service determines that the present state of the UAV matches the desired state, the tasking service assigns the task to the UAV. In an implementation, the tasking service may also record the assignment in a data log by which it can track the availability of various UAVs for performing tasks, provide a real-time summary of task assignments to a user such as a fleet dispatcher, or ensure a more balanced distribution of tasks across the fleet.

With the task assigned to the UAV, the UAV receives service information pertaining to performing the task (step 403). The service information includes contextual information about the task, such as where and when the task is to be performed, along with actions, or activities to be performed. Service information may also identify an ancillary service for receiving any data produced by the UAV (e.g., sensor data or imaging data captured by onboard sensors or cameras), along with connection information by which the UAV can communicate with the ancillary service, such as sending the task data to the ancillary service for further handling, storage, etc. Connection information can include a web address (e.g., a URL or IP address), credential information (e.g., an account login and password), encryption keys, and/or authentication tokens.

With a task assigned and having received service information pertaining to the task, the UAV performs the task according to the service information (step 404). A task may comprise one or more actions for a UAV to perform at a given location or set of locations at a given time or period of time. Tasks can include information about actions to be performed while in flight. Actions performed during the task can include gathering sensor data from onboard sensors or gathering imaging data from onboard cameras. Sensor data can include data from barometers, altimeters, electromagnetic sensors (e.g., infrared or ultraviolet), anemometers or wind sensors, magnetometers, radiation detectors, audio sensors, and so on. Imaging data can include still photography, video footage, infrared imaging, or data from various types of night vision technologies. Actions can also include gathering physical samples, such as air or water samples, delivering items, including pick-up and drop-off, performing radar or sonar detection, or other specialized activities such as crop-spraying.

In an implementation, a task assigned by the tasking service may comprise teleoperation of the UAV by a remote user, wherein the user remote from the UAV (e.g., without line of sight to the UAV) pilots the UAV according to a first-person view transmitted by an onboard camera. Using a remote computing device, the remote user may access the flight control system onboard the UAV for teleoperation of the UAV via a specialized API which facilitates extremely low latency signal transmission to and from the UAV.

In an implementation, a UAV may be tasked with uploading media from an ancillary data service, such as performing a software update by uploading the update from a data service hosted by the UAV manufacturer and installing it. Alternatively, the UAV may be tasked with uploading a programmed flight path comprising a route and operating characteristics such as flight speed and orientation. The task may also comprise actions for the UAV to perform as it flies the programmed flight path, such as gathering photographs of locations along the route or gathering environmental data, such as carbon dioxide or ozone measurements. The task may also comprise sending the data gathered during performance of the task to a data service such as cloud data storage from which it may be retrieved for analysis.

In still other implementations, in a scenario where a UAV is tasked with flying autonomously or semi-autonomously, such as flying a programmed flight path, the remote computing device can receive on-demand or real-time video footage captured by an onboard camera for display in the client application. For example, in an emergent situation, a remote user such as a first responder may task a UAV for immediate deployment, wherein the UAV travels a predetermined route and continually transmits video footage of the area of the emergency as it flies, and wherein the remote user can issue real-time flight commands in the user interface of a web-enabled application in the browser of the user's computing device to adjust the orientation of the UAV to obtain different perspectives of the area along the route.

In other implementations, a UAV may be assigned the task of flying to a location, gathering sensor or imaging data, such as photographs of a particular location, then transmitting the data to a cloud data storage specified in the service information of the task. Alternatively, the assigned mission may be to make repeated visits to a location to gather sensor or imaging data at regular intervals and to transmit the data to cloud storage for later analysis.

Referring again to FIG. 1, operational environment 100 illustrates a brief example of processes 200, 300, and 400 as employed by computing device 120, task management service 110, and UAV 130.

In operation, computing device 120 executes an application which displays a user interface for planning tasks for UAVs such as UAV 130 and which interfaces with task management service 110. From the user interface, a user, such as a drone fleet dispatcher or drone pilot, configures task parameters comprising service information and desired state information. Service information can include contextual information (e.g., where and when the task is to be performed), actions the UAV is to take in executing the task, and connection information by which the UAV can connect to and communicate with an ancillary data service. Desired state information can include operational characteristics of the UAV for performing the task, such as a battery charge level and a wireless connectivity strength which indicates the strength of a signal received by the UAV from wireless access point 150. Desired state information may also include the location of the UAV and the availability of the UAV to perform the task.

When a task is configured in the user interface of computing device 120, the client or application sends the task parameters to task management service 110. In an implementation, the client application interfaces with task management service 110 via an API across one or more wired or wireless networks, and the client application is web-enabled so that a user can configure a task from any connected computing device without having to download a customized (i.e., platform-dependent) application.

Task management service 110 communicates with UAV 130 across one or more wired and wireless networks by means of wireless access point 150 to which the UAV 130 has established a wireless network connection. In an implementation, task management service 110 communicates with the UAVs of UAV fleet 132, such as receiving vehicle state information from the UAVs and transmitting task parameters to a UAV, using an API.

Task management service 110 continually receives vehicle state information from UAV 130 and other UAVs of UAV fleet 132. State information comprises operational characteristics relating to the present state of the vehicle, such as battery charge level, wireless signal strength, and the location of the vehicle. Present state information can also include information relating to the availability of the UAV to perform a task, software versions, data storage capacity, camera resolution, time in service, or types of onboard sensor devices. In an implementation, the UAVs continually transmit state information to task management service 110 which receives and queues the state information for evaluation with respect to desired state parameters of tasks to be assigned.

Task management service 110 receives task parameters from computing device 120 comprising the service information and desired state information associated with a task to be assigned to and performed by a UAV. With the desired state information, task management service 110 continually evaluates the state information received from the UAVs to determine a UAV to be assigned to the task. In an implementation, as the state information for the vehicles is received, task management service 110 queues the state information for evaluation, such as on a first-in, first-out basis or on a priority basis (e.g., on the basis of battery charge level, signal strength, or some other operational characteristic).

When task management service 110 detects that the present state information of, for example, UAV 130 matches the desired state information of a task received from computing device 120, it will assign the task to UAV 130. Determining that the present state "matches" the desired state may comprise determining that corresponding parameters are the same or that a present state parameter satisfies a desired state parameter. If a match is not detected, task management service 110 evaluates the next set of present state information in the queue with respect to the desired state, and so on, until a match is determined.

Upon determining that the present state of UAV 130 matches the desired state of a task, task management service sends service information associated with the task to UAV 130. UAV 130 receives the service information and performs the actions associated with task according to the task parameters. Actions associated with the task may include uploading data generated during the performance of the task to cloud data storage or other ancillary data service. For example, the UAV may be tasked with capturing livestream video and transmitting the video to a video relay service from which computing device 120 or another connected device can access and display the video as it is captured and transmitted.

Figure 5:
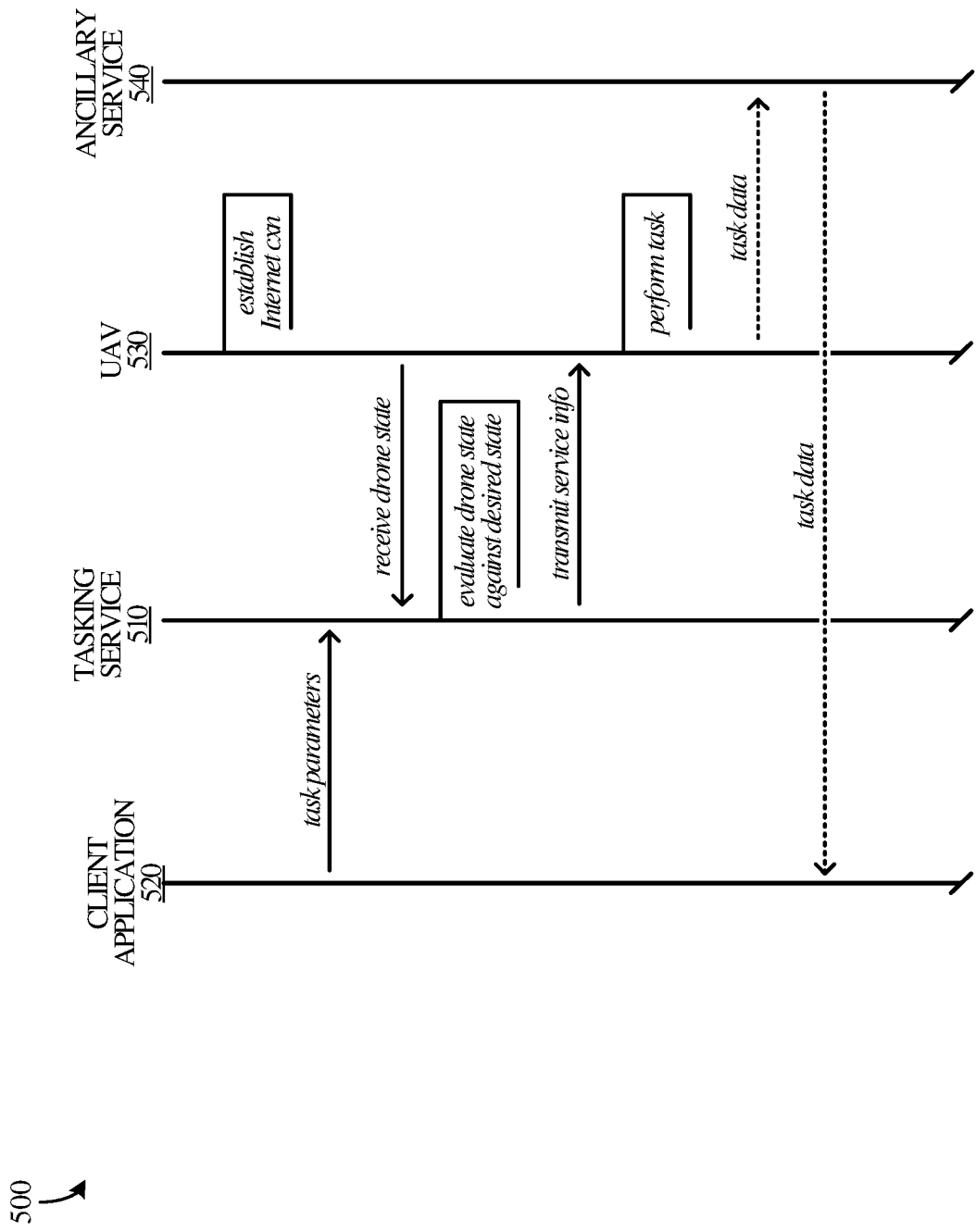
FIG. 5 illustrates an operational scenario of task planning for an unmanned aerial vehicle in an implementation.

Turning now to FIG. 5, FIG. 5 illustrates operational scenario 500 of task planning for UAVs in an implementation. Operational scenario 500 is representative of various processes, such as processes 200, 300, and 400, associated with UAV task planning.

In operation, UAV 530 establishes a wireless Internet connection via a wireless access point (e.g., Wifi router) by which UAV 530 communicates with tasking service 510 and other connected cloud-hosted services, such as ancillary service 540. UAV 530 continually transmits its state information to tasking service 510, which receives and queues the state information for use in assigning tasks. Tasking service 510 receives task parameters from client application 520 executing on a remote computing device. In various implementations, client application 520 displays a user interface, such as user interface 600 illustrated in FIG. 6, by which it receives user input comprising task parameters associated with performing a task. The task parameters include service information pertaining to the task and desired state information pertaining to the operational characteristics of the UAV performing the task.

Upon receiving the task parameters from client application 520, tasking service 510 evaluates the state information of UAV 530 against the desired state of the task. When tasking service 510 determines that the state information of UAV 530 matches the desired state of the task, it assigns the task to UAV 530 and provides service information associated with the task to UAV 530.

At the designated time and place of the task, UAV 530 performs the task. In various implementations, data generated in the course of performing the task is transmitted by UAV 530 to ancillary service 540. Client application 520 may retrieve and display the generated data from ancillary service 540.

Figure 6:
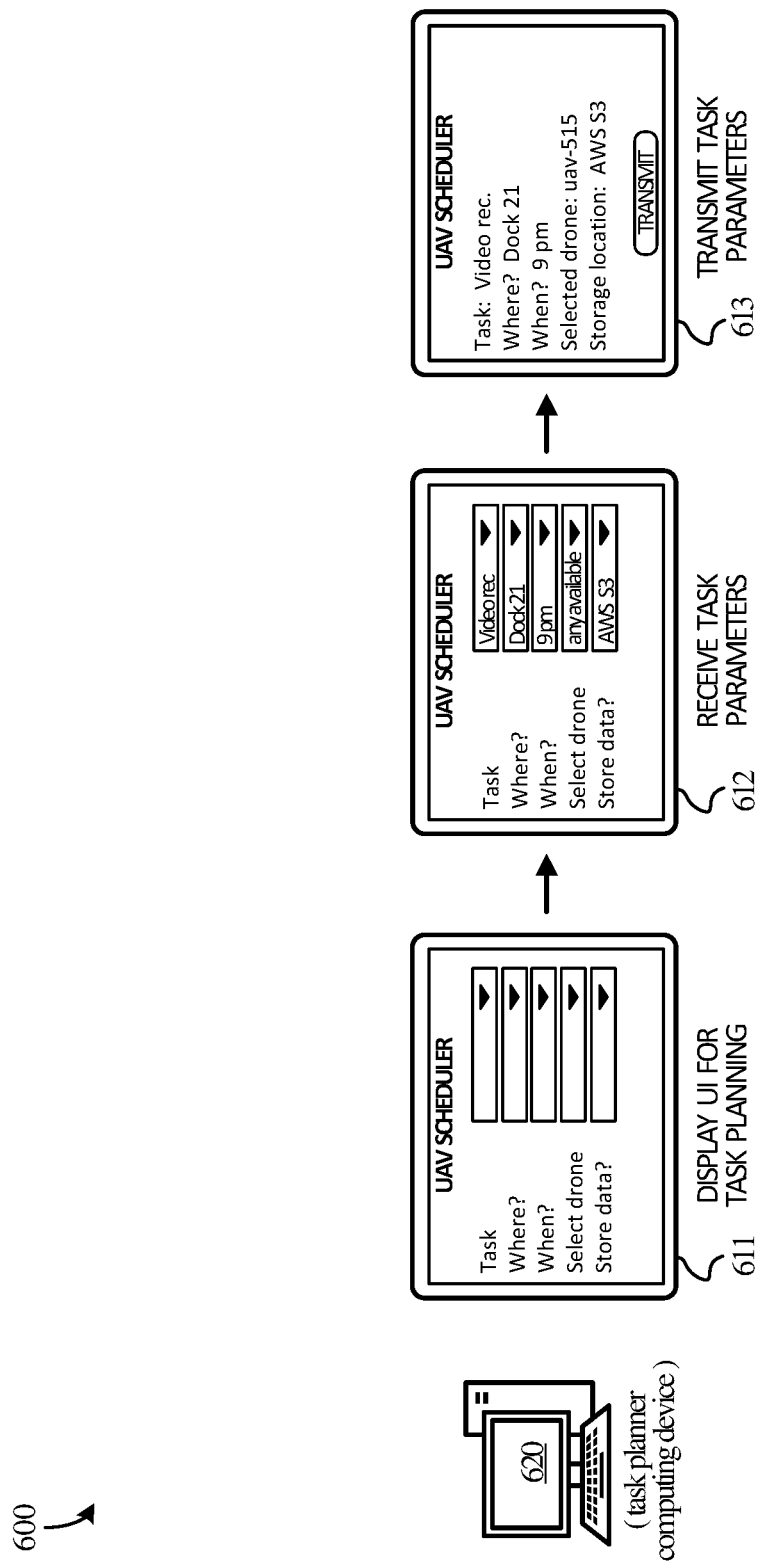
FIG. 6 illustrates views of a user interface of a client application for UAV task planning in an implementation.

FIG. 6 illustrates operational scenario 600 including views 611-613 of a user interface of UAV task planning application in an implementation. A task planning application is executing on computing device 620. The task planning application communicates with a tasking service for managing task assignments for UAVs. In view 611, the user interface displays some task parameters by which a user, such as UAV dispatcher or UAV teleoperator, can configure a task for assignment. Task parameters can include the type of task or actions to be performed and where and when the task is to be performed. The location of the task may be specified as geographic location (e.g., GPS coordinates comprising latitude and longitude), a postal or street address, or a location internal to an organization, such as points or locations within a campus or facility. Location information may also include an altitude at which the task is performed. In still other implementations, the location of the task may comprise a programmed flight path which is uploaded to the UAV.

In view 611, a user may also select a specific UAV for performing the task, or the user may allow the tasking service to select a drone based on the desired state information of the task. A user may also be prompted to provide information relating to an ancillary data service for sending data to or receiving data from the UAV, such as a data storage location for receiving imaging data, a telemetry data service for receiving telemetry data, or a website for downloading software updates. Ancillary data service information also comprises connectivity information, such as account access information (e.g., logins and passwords), other credential information, and encryption keys for encrypted data transfer between the UAV and the data service.

In view 612, the user interface receives user input comprising various selections for video recording tasks. In this example, a UAV to be selected by the tasking service is to record video footage of a location ("Dock 21") at 9 pm. The UAV is to transmit the footage to cloud data storage indicated by "AWS S3." In various implementations, the task may be scheduled as either a one-off or a recurring task, for example, to be repeated nightly, or the task may be performed on-demand.

In view 613, once the task has been configured, the application transmits the task parameters to the tasking service. Upon receiving the task parameters, the tasking service selects a UAV for performing the task by evaluating the state information of the various UAVs available for the work with respect to the desired state parameters received from the application and based on information provided in the application.

Figure 7:
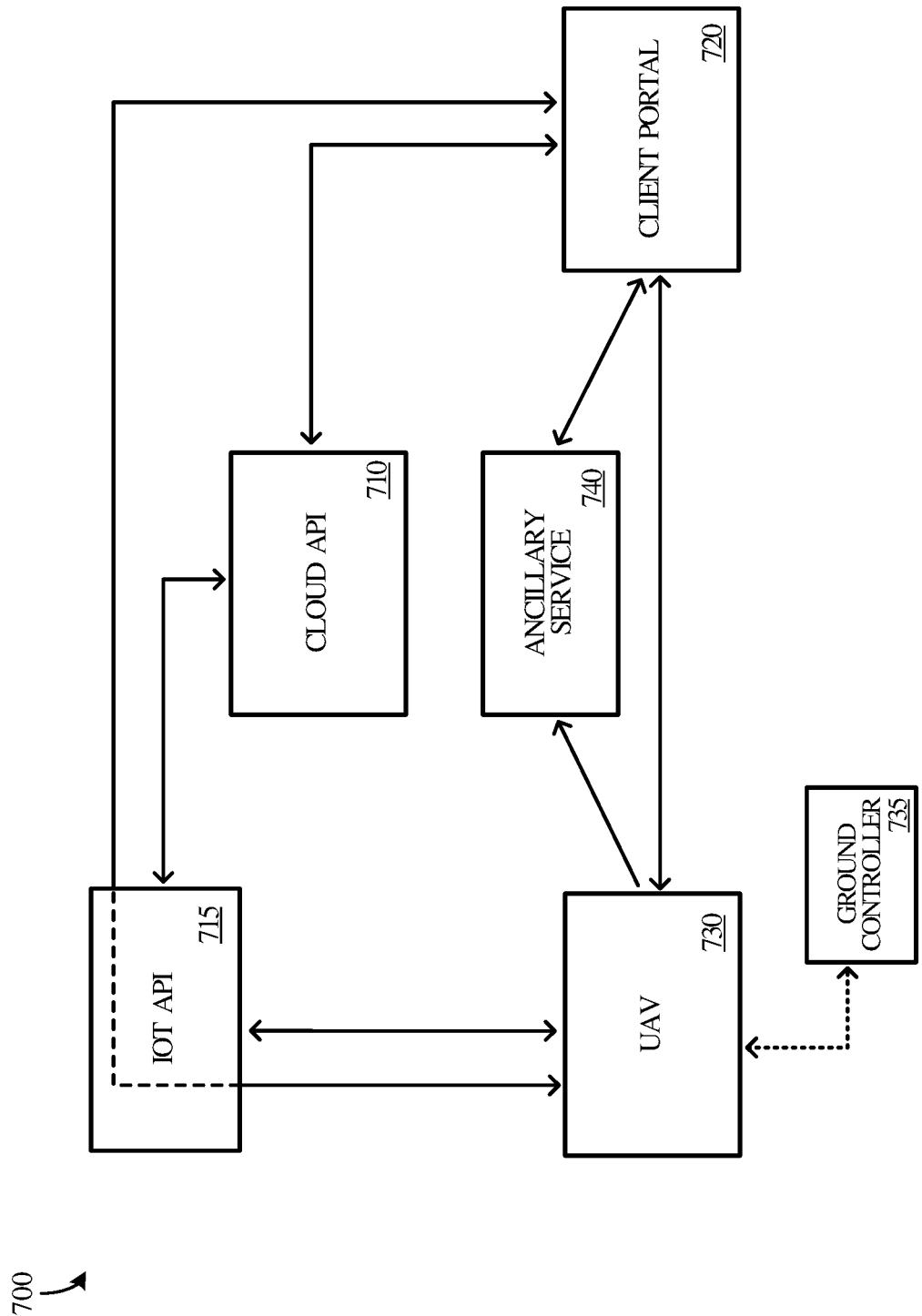
FIG. 7 illustrates an operational architecture of a UAV task planning system in an implementation.

FIG. 7 illustrates operational architecture 700 for a UAV task planning system in an implementation. Operational architecture 700 includes client portal 720 which serves as a client to cloud API 710 for access to UAV 730. Cloud API 710 interfaces at least with client portal 720 and IOT API 715. It may be appreciated that multiple other connections or channels of communication occur between components of operational architecture 700 which are not shown for the sake of clarity. Client portal 720 comprises a web-enabled application executing on a computing device remote from UAV 730. Client portal 720 communicates with UAV 730 over data and/or video channels such as webRTC channels. Client portal 720 may also communicate with ancillary service 740 over webRTC channels. Ancillary service 740 comprises cloud data storage for handling data or video from UAV 730.

Tasks assigned to UAV 730 can include real-time operations, such as livestream video received by client portal 720 or teleoperation of UAV 730 from client portal 720. In an implementation, one or more channels for communication are enabled between client portal 720 and UAV 730. On the UAV side, UAV 730 authenticates with cloud API 710 to get an authentication token to connect to IOT API 715. IOT API 715 comprises a web service that provides a real-time message bus between cloud API 710 and drones such as UAV 730. With the authentication token, UAV 730 authenticates with a web socket service of IOT API 715. UAV 730 creates a secure web tunnel to its flight control system via IOT API 715. While UAV 730 is connected to IOT API 715, it can communicate its vehicle state to cloud API 710.

On the client side, client portal 720 connects to UAV 730 via cloud API 710. Client portal 720 sends a request to cloud API 710 for access to UAV 730. Cloud API 710 receives the request and validates that the user and UAV 730 are in the same organization and that the user is allowed to teleoperate UAV 730. UAV 730 then connects to client portal 720 via a webRTC channel. IOT API 715 transmits flight operation credentials to client portal 720 for connecting to the flight control system of UAV 730. The client application at client portal 720 can also request UAV 730 enter a desired state (e.g., for teleoperation), and IOT API 715 will broadcast that desired state to UAV 730 when it is connected and online.

The web socket service within IOT API 715 acts as a communication bridge between UAV 730 and cloud API 710. The web socket service allows UAV 730 to transmit live data and telemetry to cloud API 710 which may be used by fleet operators to obtain a live status of their fleet. The web socket channel is used as the secure link to exchange other configuration and credentials information. For example, when enabling low-latency video streaming or teleoperation, the web socket channel is used to send time-limited credentials for UAV 730 to connect using webRTC to a separate service, such as ancillary service 740, or to a "peer." UAV 730 uses the credentials to establish a webRTC link for streaming video and data, often achieving latencies below ~150 ms.

When UAV 730 has media to upload to the cloud, the web socket channel allows UAV 730 to exchange metadata with cloud servers and receive time-limited pre-signed upload URLs for directly uploading media to standard cloud storage providers such as AWS S3.

In various implementations, communication between UAV 730 and cloud API 710 is secured by using RSA key pairs for encryption and signing of the data transmissions.

A number of advantages accrue with direct Internet access to a UAV. First, access to data produced on the UAV is not limited to what is whitelisted and/or otherwise available through a mobile application or ground-station. Next, the direct connection enables a more direct and lower-latency network path to the cloud than through a ground station. In addition, direct connectivity allows for compatibility with a broad range of computing devices using standard web protocols.

Optionally, UAV 730 may indirectly connect to various cloud services through ground controller 735. Ground controller 735 is representative of a ground station, docking station, base station, local controller, or other mobile control device in the proximity of and in wireless communication with UAV 730. Ground controller 735 may connect with a wireless Internet access point to communicate with various cloud services, for example, to relay vehicle state information from UAV 735 to a vehicle tasking service or to transfer task data to a cloud-based data storage.

FIG. 8 illustrates systems architecture 800 of a UAV, such as UAV 130 of FIG. 1, in an implementation. Systems architecture 800 includes flight control system 820, electromechanical system 840, and operational inputs 890. Flight control system 820 comprises one or more receivers RX 831 for receiving operational inputs 890, such as wireless network communication or flight commands from a remote control device. Flight control system 820 further comprises flight controller 821, inertial measurement unit (IMU) 832, camera 833, GPS sensor 834, transmitter TX 835, and data storage 836. Data storage 836 includes persistent or non-volatile memory or a removable memory card (e.g., an SD card) for recording flight and sensor data gathered from onboard devices, including photos or video captured by onboard cameras, or for storing programmed flight programs for use by the UAV. Flight control system 820 may also comprise one or more other sensors 837 such as barometers, altimeters, additional cameras, heat-detecting sensors, electromagnetic sensors (e.g., infrared or ultraviolet), anemometers or wind sensors, magnetometers, and so on. Onboard camera 833 comprises a device for capturing imaging data, such as video or still photography, across visible and other wavelengths of the electromagnetic spectrum, such as ultraviolet or infrared wavelengths.

Electromechanical system 840 provides the propulsion for the UAV, typically comprising an electronic speed controller which throttles one or more rotors according to flight instructions received from flight control system 820. It may be appreciated that both flight control system 820 and electromechanical system 840 can include other elements in addition to (or in place of) those disclosed herein, which are illustrated for exemplary purposes.

Turning now to FIG. 9, architecture 900 illustrates computing device 901 that is representative of any system or collection of systems in which the various processes, programs, services, and scenarios disclosed herein may be implemented. Examples of computing device 901 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements task planning process 906, which is representative of the UAV task planning processes discussed with respect to the preceding Figures, such as processes 200, 300, and 400. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including UAV task planning process 906) may be implemented in program instructions and among other functions may, when executed by processing system 902, direct processing system 902 to operate as described with respect to the various operational scenarios, sequences, and processes illustrated herein. For example, software 905 may include program instructions for implementing the UAV task planning processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to support sensor device deployments and swaps. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary, etc.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a tasking service for unmanned aerial vehicles comprising:
  receiving, in a user interface of a client application, user input comprising task parameters and service information, wherein the task parameters comprise a desired state of the unmanned aerial vehicles for performing a task and wherein the service information comprises an ancillary service for receiving data generated in association with performing the task;
  establishing, by the tasking service, network communication with the unmanned aerial vehicles via wireless connections of the unmanned aerial vehicles to one or more Internet access points;
  continuously receiving state information from the unmanned aerial vehicles over the wireless connections with the unmanned aerial vehicles, wherein the state information identifies a present state of each of the unmanned aerial vehicles;
  storing, by a queueing service of the tasking service, the present states of the unmanned aerial vehicles in a queue for evaluation with respect to the desired state identified in the task parameters;
  continuously evaluating the present states of the unmanned aerial vehicles in the queue with respect to the desired state identified in the task parameters;
  determining that a present state of the unmanned aerial vehicle matches the desired state; and
  in response to determining that the present state of the unmanned aerial vehicle matches the desired state:
    assigning the task to the unmanned aerial vehicle; and
    transmitting, via a wireless connection of the wireless connections, the service information to the unmanned aerial vehicle.

2. The method of claim 1, wherein receiving, in the user interface of the client application, the task parameters comprises receiving the task parameters via an application programming interface from the client application, wherein the client application is executing on a computing device that is remote with respect to the tasking service and the unmanned aerial vehicles and wherein the task parameters comprise a scheduling frequency of the task.

3. The method of claim 2, wherein the service information associated with performing the task further comprises connection information for connecting to the ancillary service associated with the task, wherein the ancillary service comprises one or more of a cloud storage service and a video relay service.

4. The method of claim 3, wherein the connection information for connecting to the ancillary service comprises one or more of a Uniform Resource Locator (URL), credential information, and an encryption key.

5. The method of claim 1, wherein the task parameters associated with performing the task comprise a workload, wherein the workload comprises actions to be taken in association with performing the task.

6. The method of claim 1, wherein the desired state comprises one or more operational characteristics of the unmanned aerial vehicle pertaining to the task, wherein the operational characteristics comprises a battery charge level and a wireless connectivity strength.

7. The method of claim 1, wherein the state information from the unmanned aerial vehicles includes a battery charge level, a wireless connectivity strength, and a vehicle location of each of the unmanned aerial vehicles.

8. The method of claim 1 further comprising receiving state information from an unmanned aerial vehicle via a controller in communication with the unmanned aerial vehicle.

9. The method of claim 1, wherein the method further comprises enabling an unmanned aerial vehicle to enter the desired state when the present state of the unmanned aerial vehicle is not the desired state.

10. An unmanned aerial vehicle comprising:
  a flight control system onboard the unmanned aerial vehicle comprising one or more processors; and
  one or more computer readable storage media having program instructions stored thereon that, when executed by the one or more processors of the flight control system, direct the flight control system to at least:

establish a wireless connection to an Internet access point for network communication with a tasking service;

continually send, via the wireless connection, state information of the unmanned aerial vehicle to the tasking service, wherein the state information pertains to a present state of the unmanned aerial vehicle, wherein the tasking service evaluates the present state against a desired state associated with a task, wherein the tasking service determines that the present state matches the desired state, and wherein, in response to determining that the present state matches the desired state, the tasking service assigns the task to the unmanned aerial vehicle;

receive, via the wireless connection, service information pertaining to the task from the tasking service, wherein service information comprises an ancillary service associated with the task and wherein the service information was received in a user interface of a client application of the tasking service, wherein the user interface is configured to receive user input comprising the service information; and perform the task according to the service information pertaining to the task.

11. The unmanned aerial vehicle of claim 10, wherein the network communication with the tasking service comprises an application programming interface.

12. The unmanned aerial vehicle of claim 10, wherein the service information associated with performing the task further comprises connection information for connecting to the ancillary service associated with the task, wherein the ancillary service comprises one or more of a cloud storage service and a video relay service.

13. The unmanned aerial vehicle of claim 12, wherein the connection information for connecting to the ancillary service comprises one or more of a Uniform Resource Locator (URL), credential information, and an encryption key.

14. The unmanned aerial vehicle of claim 10, further comprising receiving, via the wireless connection, task parameters associated with performing the task, wherein the task parameters associated with performing the task comprise a workload, wherein the workload comprises actions to be taken in association with performing the task.

15. The unmanned aerial vehicle of claim 10, wherein the state information of the unmanned aerial vehicle includes a battery charge level, a wireless connectivity strength, and a vehicle location.

16. The unmanned aerial vehicle of claim 10, wherein the desired state comprises one or more operational characteristics of the unmanned aerial vehicle pertaining to the task, wherein the operational characteristics comprise a battery charge level and a wireless connectivity strength.

17. One or more computer readable storage media having program instructions stored thereon that, when executed by one or more processors operatively coupled to the one or more computer readable storage media, direct a computing apparatus to at least:

display a user interface for an application for scheduling tasks to be performed by unmanned aerial vehicles;

receive, via the user interface, user input comprising task parameters for a task, wherein the task parameters identify a desired state of an unmanned aerial vehicle for performing the task and service information associated with performing the task, wherein the service information comprises an ancillary service associated with the task; and send the task parameters to a tasking service, wherein the tasking service assigns the task to an unmanned aerial vehicle based on evaluating a present state of one or more of the unmanned aerial vehicles with respect to the desired state identified in the task parameters and determining that the present state matches the desired state; and receive data produced by the unmanned aerial vehicle in performing the task, wherein the data produced by the unmanned aerial vehicle is transmitted by the unmanned aerial vehicle via a wireless connection of the unmanned aerial vehicle to an Internet access point.

18. The one or more computer readable storage media of claim 17, wherein the service information associated with performing the task further comprises connection information for connecting to the ancillary service associated with the task, wherein the ancillary service comprises one or more of a cloud storage service and a video relay service.

19. The one or more computer readable storage media of claim 18, wherein the desired state comprises one or more operational characteristics of the unmanned aerial vehicle pertaining to the task, wherein the operational characteristics comprise a battery charge level and a wireless connectivity strength.

20. The one or more computer readable storage media of claim 17, wherein the task parameters associated with performing the task comprise a workload, wherein the workload comprises actions to be taken in association with performing the task.

* * * * *